(12) United States Patent
Ibusuki (10) Patent No.: US 10,052,949 B2
(45) Date of Patent: Aug. 21, 2018

(54) DRIVETRAIN CONTROL METHOD AND SYSTEM

(71) Applicant: GKN Driveline Japan Ltd, Tochigi, Tochigi (JP)

(72) Inventor: Akira Ibusuki, Bonn (DE)

(73) Assignee: GKN Driveline Japan Ltd., Tochigi (JP)

( * ) Notice: Subject to any disclaimer, the term of this patent is extended or adjusted under 35 U.S.C. 154(b) by 362 days.

(21) Appl. No.: 14/963,404

(22) Filed: Dec. 9, 2015

(65) Prior Publication Data
US 2016/0090083 A1 Mar. 31, 2016

Related U.S. Application Data

(63) Continuation of application No. 14/491,103, filed on Sep. 19, 2014, now Pat. No. 9,352,647, which is a
(Continued)

(30) Foreign Application Priority Data

May 15, 2012 (JP) ................................. 2012-111188

(51) Int. Cl.
*B60K 6/48* (2007.10)
*F16H 3/089* (2006.01)
(Continued)

(52) U.S. Cl.
CPC .............. *B60K 17/356* (2013.01); *B60K 6/20* (2013.01); *B60K 6/26* (2013.01); *B60K 6/387* (2013.01);
(Continued)

(58) Field of Classification Search
CPC ... B60K 6/48; B60K 2006/4825; F16H 3/089; F16H 59/02
(Continued)

(56) References Cited

U.S. PATENT DOCUMENTS 7,140,461 B2 * 11/2006 Morrow ................. B60K 6/365
 180/65.245
7,350,603 B2 * 4/2008 Takami .................. B60K 6/365
 180/233
(Continued)

FOREIGN PATENT DOCUMENTS

CN 1789032 A1 6/2006
CN 101386267 A 3/2009
(Continued)

OTHER PUBLICATIONS

EPO Office Action for Application No. 13790640.0 dated Mar. 9, 2016 (6 pages).
(Continued)

*Primary Examiner* — Ha Dinh Ho
(74) *Attorney, Agent, or Firm* — Bejin Bieneman PLC (57) ABSTRACT

A drivetrain system can drive a vehicle by a first motor and a second motor. A drivetrain couples the first motor with a first axle and comprises a propeller shaft transmitting torque from the first motor to a second axle and coupled with the second motor. A first clutch disconnectably connects the first motor with the propeller shaft. A second clutch disconnectably couples the propeller shaft with the second axle. The first and second motors can be activated. The first clutch can be connected to cause both the first and second motors to drive the first axle. The second clutch can be connected or disconnected to control torque transmission from the first motor and the second motor to the second axle, whereby the vehicle is operated in a hybrid mode in which both the first motor and the second motor drive the vehicle.

4 Claims, 4 Drawing Sheets

Related U.S. Application Data continuation of application No. PCT/JP2013/063132, filed on May 10, 2013.

(51) Int. Cl.

| | |
|---|---|
| *F16H 59/02* | (2006.01) |
| *B60K 17/356* | (2006.01) |
| *B60K 6/52* | (2007.10) |
| *B60K 23/08* | (2006.01) |
| *B60L 11/14* | (2006.01) |
| *B60W 10/08* | (2006.01) |
| *B60W 20/00* | (2016.01) |
| *B60W 10/119* | (2012.01) |
| *B60L 15/20* | (2006.01) |
| *B60K 6/26* | (2007.10) |
| *B60K 6/387* | (2007.10) |
| *B60K 6/54* | (2007.10) |
| *B60W 10/02* | (2006.01) |
| *B60K 6/20* | (2007.10) |
| *B60K 17/34* | (2006.01) |
| *B60W 10/06* | (2006.01) |
| *B60W 20/40* | (2016.01) |
| *B60K 17/346* | (2006.01) |
| *B60K 17/35* | (2006.01) |

(52) U.S. Cl.
CPC ............... *B60K 6/48* (2013.01); *B60K 6/52* (2013.01); *B60K 6/54* (2013.01); *B60K 17/34* (2013.01); *B60K 23/08* (2013.01); *B60L 11/14* (2013.01); *B60L 15/20* (2013.01); *B60W 10/02* (2013.01); *B60W 10/06* (2013.01); *B60W 10/08* (2013.01); *B60W 10/119* (2013.01); *B60W 20/00* (2013.01); *B60W 20/40* (2013.01); *B60K 17/3462* (2013.01); *B60K 17/3515* (2013.01); *B60K 2006/4808* (2013.01); *B60L 2240/421* (2013.01); *B60L 2240/507* (2013.01); *B60L 2260/28* (2013.01); *B60L 2270/145* (2013.01); *Y02T 10/626* (2013.01); *Y02T 10/6221* (2013.01); *Y02T 10/6265* (2013.01); *Y02T 10/645* (2013.01); *Y02T 10/646* (2013.01); *Y02T 10/70* (2013.01); *Y02T 10/7077* (2013.01); *Y02T 10/72* (2013.01); *Y02T 10/7275* (2013.01); *Y10S 903/902* (2013.01); *Y10T 74/19056* (2015.01)

(58) Field of Classification Search
USPC ....... 74/665 B, 665 L, 665 M, 665 N, 665 Q
See application file for complete search history.

(56) References Cited

U.S. PATENT DOCUMENTS

| | | | |
|---|---|---|---|
| 8,177,672 B2 | 5/2012 | Kato et al. | |
| 8,556,773 B2* | 10/2013 | Oba | B60W 10/16 477/115 |
| 8,825,324 B2 | 9/2014 | Horaguchi et al. | |
| 9,022,158 B2* | 5/2015 | Mita | B60K 17/34 180/233 |
| 9,352,647 B2* | 5/2016 | Ibusuki | B60W 10/119 |
| 9,376,015 B2* | 6/2016 | Takaira | B60K 17/35 |
| 2007/0193793 A1 | 8/2007 | Burrows et al. | |
| 2010/0044138 A1* | 2/2010 | Marsh | B60K 17/348 180/247 |
| 2010/0094519 A1 | 4/2010 | Quehenberger et al. | |
| 2014/0051541 A1* | 2/2014 | Osborn | B60K 23/08 475/209 |

FOREIGN PATENT DOCUMENTS

| | | |
|---|---|---|
| JP | 2003335143 | 11/2003 |
| JP | 2009269605 | 11/2009 |
| JP | 2011079421 | 4/2011 |
| JP | 2012061923 | 3/2012 |

OTHER PUBLICATIONS

Chinese Office Action for Application No. 201380024481.3 dated Apr. 6, 2016 (5 pages).
International Search Report dated Jun. 27, 2013 (1 page).
Second Official Action issued by the Chinese Intellectual Property Office for CN201380024481.3 dated Jan. 19, 2017 (with English translation; 7 pages).

* cited by examiner

DRIVETRAIN CONTROL METHOD AND SYSTEM

CROSS-REFERENCE TO RELATED APPLICATIONS

This application is a continuation Application of and claims priority to co-pending application Ser. No. 14/491,103 (filed Sep. 19, 2014), which is in turn a continuation Application of PCT International Application No. PCT/JP2013/063132 (filed May 10, 2013), which is in turn based upon and claims the benefit of priority from Japanese Patent Application No. 2012-111188 (filed May 15, 2012), the entire contents of each of which are incorporated herein by reference in their entireties.

FIELD

The present disclosure relates to a method and a system for controlling a drivetrain, which realize various running modes including a hybrid FF mode, a hybrid 4WD mode, a pure EV FF mode, and a pure EV FR mode.

BACKGROUND

A so-called part-time four-wheel-drive vehicle is comprised of primary axles (front axles for example) steadily driven by a primary drivetrain and secondary axles (rear axles for example) driven by a secondary drivetrain. When a changeover device uncouples the secondary drivetrain from the primary drivetrain, the vehicle runs in a two-wheel-drive mode. When the changeover device couples the secondary drivetrain with the primary drivetrain, drive force is transmitted via a shaft to the secondary drivetrain, thereby realizing a four-wheel-drive mode.

Although the aforementioned changeover is, without a speed synchronizer, enabled only in a case where the vehicle is idling, there are also known drivetrains which enable changeover during travel. In the latter drivetrains, frictionally-locking clutches are often applied.

Japanese Patent Application Laid-open No. 2009-269605, US Publication 2010/0094519, and Japanese Patent Application Laid-open No. 2003-335143 disclose related arts.

SUMMARY

A drivetrain with a propeller shaft coupled with an electric motor can realize various running modes depending on a control method and a control system, some of which had not been known in the prior art. The subject as described below provides such a method and a system.

According to a first aspect, disclosed is a method for controlling a drivetrain to drive a vehicle by a first motor and a second motor, the drivetrain coupling the first motor with a first axle and comprising a propeller shaft transmitting torque from the first motor to a second axle and being coupled with the second motor, a first clutch for disconnectably connecting the first motor with the propeller shaft, and a second clutch for disconnectably coupling the propeller shaft with the second axle. The method is comprised of: activating the first motor and the second motor; connecting the first clutch to cause both the first motor and the second motor to drive the first axle; and connecting or disconnecting the second clutch to control torque transmission from the first motor and the second motor to the second axle, whereby the vehicle is operated in a hybrid mode in which both the first motor and the second motor drive the vehicle.

According to a second aspect, disclosed is a drivetrain system to drive a vehicle by a first motor and a second motor. The system is comprised of: a drivetrain coupling the first motor with a first axle and comprising a propeller shaft transmitting torque from the first motor to a second axle and being coupled with the second motor, a first clutch for disconnectably connecting the first motor with the propeller shaft, and a second clutch for disconnectably coupling the propeller shaft with the second axle, means for activating the first motor and the second motor; means for connecting the first clutch to cause both the first motor and the second motor to drive the first axle; and means for connecting or disconnecting the second clutch to control torque transmission from the first motor and the second motor to the second axle, whereby the vehicle is operated in a hybrid mode in which both the first motor and the second motor drive the vehicle.

DETAILED DESCRIPTION OF A PREFERRED EMBODIMENT

Exemplary embodiments will be described hereinafter with reference to FIGS. 1 through 4.

Throughout the specification and the appended claims, the term "motor" should be taken in the broad sense of a drive force source including an internal combustion engine and an electric motor unless otherwise noted.

A first embodiment will be described below. As the following description takes a front-wheel-drive based vehicle in which a motor is steadily connected with its front axle as an example, first axles are front axles and second axles are rear axles, but this relation may be reversed. The present embodiment may be further applied to a rear-wheel-drive based vehicle or the other types of vehicles.

Figure 1:
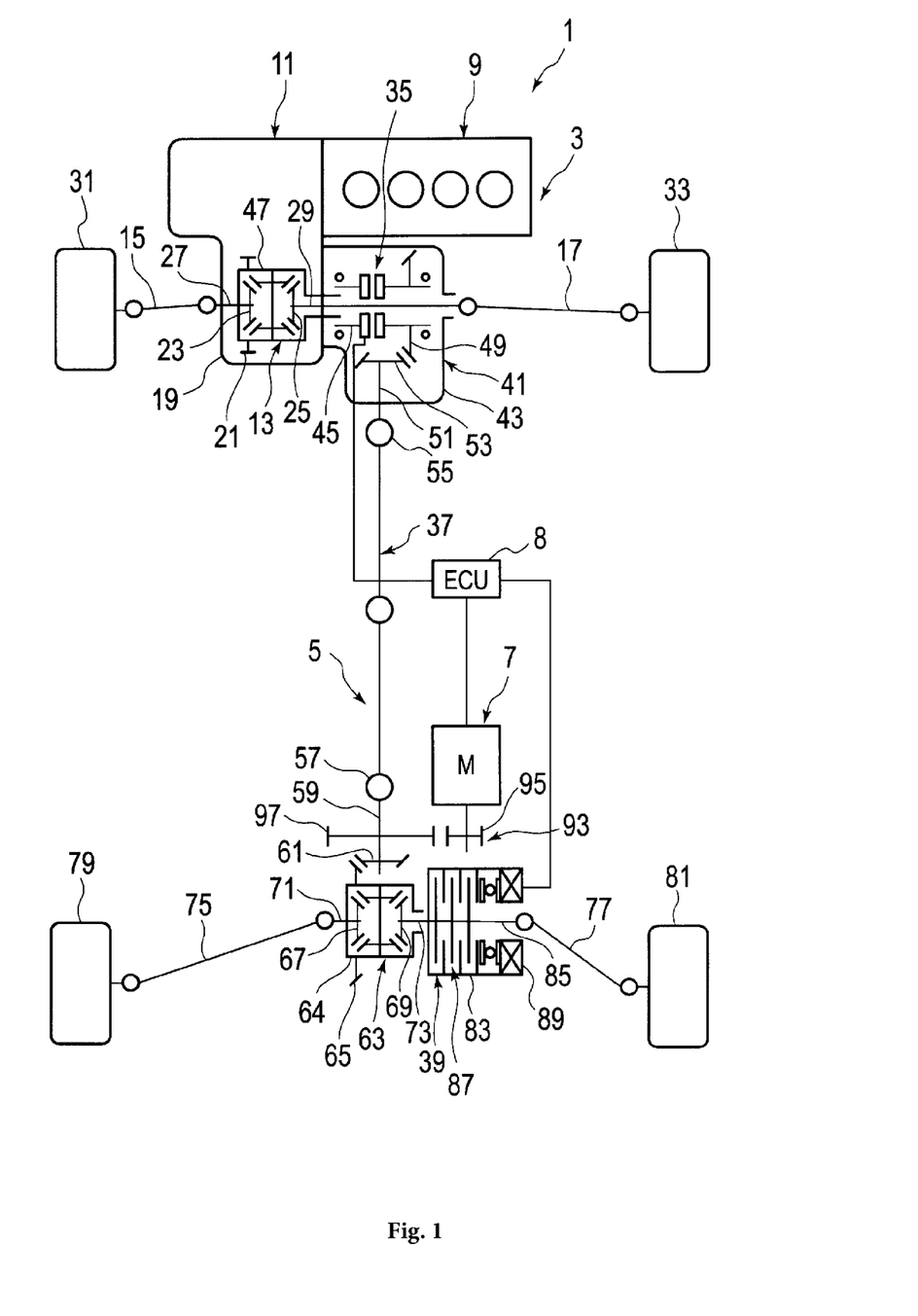
FIG. 1 is a schematic drawing depicting a drivetrain according to a first embodiment.

Referring to FIG. 1, a vehicle comprising a motor 9 transmits drive force to a drivetrain 1 via a transmission 11. The drivetrain 1 is comprised of a first drivetrain section 3, a second drivetrain section 5, and an intermediate train section including a propeller shaft 37 interposed therebetween. The first drivetrain section 3 steadily transmits the transmitted drive force via a front differential 13 to front axles 15, 17, thereby driving them. The second drivetrain section 5 is drivingly coupled with rear axles 75, 77 via a rear differential 63. The intermediate train section, when connected with both the drivetrain sections 3, 5, transmits a part of the drive force transmitted to the first drivetrain section 3 to the second drivetrain section 5.

The drivetrain 1 is further comprised of a first clutch mechanism 35 and a second clutch mechanism 39. The first clutch mechanism 35 disconnectably connects the first drivetrain section 3 with the intermediate train section. The second clutch mechanism 39 disconnectably connects the intermediate train section with the second drivetrain section 5. More specifically, when both the first clutch mechanism 35 and the second clutch mechanism 39 get disconnected, the drive force is transmitted only to the front wheels and therefore the vehicle runs in a front-wheel drive mode. By contrast, when both these mechanisms get connected, the drive force is transmitted also to the rear wheels and therefore the vehicle runs in a four-wheel drive mode.

Further the drivetrain 1 is comprised of an electric motor 7, which is drivingly coupled with the intermediate train section. The electric motor 7 drives the intermediate train section including the propeller shaft 37, thereby rotation speeds are synchronized without friction in the clutches at a time of shift into the four-wheel drive mode.

In more detail, the motor 9 can be an internal combustion engine such as a gasoline engine. In combination with, or instead of, the internal combustion engine, an electric motor or any other driving force source may be used. The motor 9 is connected with the front differential 13 via the transmission 11. The transmission 11 can by itself selectively enable and disable transmission of the driving force, as is known from the prior art.

The drivetrain section 3 is comprised of a front differential 13. The totality of the front differential 13 may be housed and supported by a bell housing 19 coupled with the transmission 11. The front differential 13, via a ring gear 21, receives the drive force from the transmission 11, whereby its casing 47 rotates about its axis.

The casing 47 contains a differential gear set of a bevel gear type or another type. Connected to side gears 23,25 of the differential gear set, respectively, are left and right mediate shafts 27,29, to which the front axles 15,17 are further connected. Thereby the front differential 13 differentially distributes the received drive force to the front axles 15,17. The front axles 15,17 are respectively connected with front wheels 31,33 and therefore the drive force drives the front wheels 31,33 so as to run the vehicle body without losing traction.

The drivetrain 1 comprised, to transmit a part of the aforementioned drive force to the intermediate train section, a transfer 41. The transfer 41 comprises a transfer case 43, which is coupled with the bell housing 19 for instance to have these interiors in communication with each other.

The transfer 41 is comprised of a first clutch mechanism 35 housed in the transfer case 43. The first clutch mechanism 35 comprises, on one hand, a hollow shaft 45 connected with the casing 47 of the front differential 13, thereby receiving a part of the drive force applied to the casing 47. The first clutch mechanism 35 comprises, on the other hand, an intermediate shaft comprising a ring gear 49. The ring gear 49 meshes with a pinion gear 53, which is coupled with an output shaft 51. As both the ring gear 49 and the pinion gear 53 are bevel gears, the output shaft 51 forms a proper angle, 90 degrees for example, relative to the front axles 15,17, and is led out of the transfer case 43.

To the first clutch mechanism 35 applied is a claw clutch such as a dog clutch, but any other type of clutches such as a friction clutch may be instead applied thereto. The first clutch mechanism 35 comprises an actuator based on a solenoid, an electric motor, or a hydraulic device, to enable changeover between connection and disconnection. When the first clutch mechanism 35 is connected, the drive force received from the front differential 13 is output to the output shaft 51. When the first clutch mechanism 35 is disconnected, the output shaft 51 is uncoupled from the first drivetrain section 3.

The output shaft 51 is a part of the intermediate train section and its end is, via a universal joint 55, drivingly coupled with the propeller shaft 37. An opposite end of the propeller shaft 37 is drivingly coupled with a drive pinion shaft 59 via a universal joint 55. The drive pinion shaft 59 is also a part of the intermediate train section.

The drive pinion shaft 59 comprises, to establish driving coupling with the rear differential 63, a drive pinion gear 61. The shaft further comprises a gear 97 for receiving drive force from the electric motor 7. Alternatively the gear 97 may be provided in any part in the intermediate train section.

The second drivetrain section 5 comprises a rear differential 63, a second clutch mechanism 39, and rear axles 75,77. The rear differential 63 and the second clutch mechanism 39 are housed in a single carrier case. Alternatively they may be housed in separate carrier cases but may be supported so as not to misalign these axes.

The rear differential 63 is comprised of a casing 64 and is rotatably supported by the carrier case. The casing 64 is comprised of a ring gear 65 meshing with the drive pinion gear 61 and thereby receives drive force from the motor 9 via the drive pinion shaft 59 to rotate about its axis. The casing 64 contains a differential gear set of a bevel gear type or another type, and to its side gears 67,69 respectively connected are left and right mediate shafts 71,73.

To one of the mediate shafts 71,73 (the right mediate shaft 73 in this example) connected is the second clutch mechanism 39. A friction clutch such as a multiplate clutch 87 is applied to the second clutch mechanism 39 but any other clutch such as a claw clutch may be applied thereto. Use of the multiplate clutch is beneficial in controlling distribution of the drive force to the front and rear axles by increasing or decreasing pressure on the clutch plates.

A description will now be given with taking a structure an example, in which the multiplate clutch 87 is used as the second clutch mechanism 39, the second clutch mechanism 39 comprises a clutch case 83 supporting one set of disks, a hub shaft 85 supporting another set of disks, the multiplate clutch 87 constituted of the paired set of disks, and an actuator 89 comprised of a solenoid. Instead of the solenoid, any proper pressure device such as an electric motor or a hydraulic device that is electrically controllable may be applied thereto. Based on this construction, the second clutch mechanism 39 can change over connection and disconnection between the clutch case 83 and the hub shaft 85.

One of the mediate shafts 71,73 (the right mediate shaft 73 in this example) is drivingly connected to the clutch case 83, whereby the clutch case 83 can receive drive force from the intermediate train section.

One of the rear axles 75,77 (the right rear axle 77 in this example) is connected to the hub shaft 85, and to another of the mediate shafts 71,73 (the left mediate shaft 71 in this example) another of the rear axles 75,77 (the left rear axle 75 in this example) is connected. Thereby, when the second clutch mechanism 39 is connected, the rear differential 63 differentially distributes the received drive force from the intermediate train section to the rear axles 75,77. The rear axles 75,77 are respectively connected with rear wheels 79,81, whereby the rear wheels 78,81, in addition to the front wheels 31,33, run the vehicle body.

When the second clutch mechanism 39 is disconnected, as one side gear 69 idles, no drive force is transmitted to the other side gear 67, whereby the rear differential 63 does not transmit drive force to the rear wheels 79,81. Then the rear wheels 79,81 in general make free run. Further if the first clutch mechanism 35 then is disconnected, the intermediate train section is uncoupled from the drivetrain 1 and then comes to idle.

More specifically, the second clutch mechanism 39 disconnectably connects the intermediate train section with the second drivetrain section 5. In the meantime, instead of the structure as described above, an alternative structure may be used, in which the intermediate train section is connected with the clutch mechanism and the rear differential is, via the clutch mechanism, connected with the intermediate train section.

The electric motor 7 comprises a gear 95 meshing with the gear 97. The electric motor 7 is, via a gear set 93, constituted of the gears 95,97, drivingly coupled with the intermediate train section. It may be, as shown in the drawing, connected with the drive pinion shaft 59 or connected with any other part of the intermediate train section. The gear set 93 may be a reduction gear set in order to adapt relatively high-speed rotation by the electric motor 7 to rotation suitable for the drive pinion shaft 59. Further, instead of the gear set, any other form of link such as link by a chain and a sprocket may be used.

As described above, connection and disconnection of the first clutch mechanism 35 and the second clutch mechanism 39 are electrically controlled and operation of the electric motor 7 is electrically controlled as well. To control them comprehensively, an electronic control unit (ECU) 8 may be provided and the first clutch mechanism 35, the second clutch mechanism 39 and the electric motor 7 may be connected thereto. The ECU 8 may be under direct manual control by a human driver or alternatively may be automatically controlled by an electronic control. The ECU 8 further detects rotation speeds of the electric motor 7, the drive pinion shaft 59 and the other rotary elements.

When the first clutch mechanism 35 and the second clutch mechanism 39 get disengaged synchronously, the drive force is transmitted from the motor 9 via the transmission 11 only to the front differential 13, and, via the front differential 13, is distributed via the mediate shafts 27,29 and the axles 15,17 to the front wheels 31,33, thereby running the vehicle in a two-wheel-drive mode.

When the first clutch mechanism 35 and the second clutch mechanism 39 get engaged synchronously, a part of the drive force is also transmitted via the transfer 41 to the second drivetrain section 5. This drive force is transmitted via the propeller shaft 37 to the rear differential 63, and is via the rear differential 63 distributed via the mediate shafts 71,73 and the axles 75,77 to the rear wheels 79,81, thereby running the vehicle in a four-wheel-drive mode.

In the two-wheel-drive mode, as the first clutch mechanism 35 and the second clutch mechanism 39 get disengaged, the intermediate train section is uncoupled from the drivetrain 1, and thus does not put a load on the motor 9, thereby improving fuel efficiency.

When in the two-wheel-drive mode, the drive force by the motor 9 does not act on the intermediate train section and therefore rotation of the intermediate train section is not synchronized with that of the other parts of the drivetrain 1. Thus a change is made into the four-wheel-drive mode, synchronization of rotation speeds is required. The ECU 8 detects the rotation speed of the drive pinion shaft 59 in particular and controls the rotation speed of the electric motor 7 so as to synchronize it with the rotation speeds of the first drivetrain section 3 and the second drivetrain section 5. As these rotation speeds are first synchronized and thereafter the first clutch mechanism 35 and the second clutch mechanism 39 are driven, the first clutch mechanism 35 and the second clutch mechanism 39 can respectively be engaged without slip, or with very limited slip, among these clutch plates.

Drive of the first clutch mechanism 35 and the second clutch mechanism 39 and start of the electric motor 7 can be synchronously executed under certain conditions. They may not be concurrent, however. The electric motor 7 may be first started and, after the elapse of a certain time, the clutch mechanisms 35,39 may be made engaged for example. Or, instead of the time lag, when a difference between the rotation speed of the drive pinion shaft 59 and the rotation speed of the first drivetrain section 3 and the second drivetrain section 5 comes below a certain value, the clutch mechanisms 35,39 may be driven. Further the time lag may be given between the engagement of the first clutch mechanism 35 and the engagement of the second clutch mechanism 39. Alternatively, these controls may be made under any other proper conditions.

According to the present embodiment, combinations of switch of the transmission 11 and the clutch mechanisms 35,39, and switch of the electric motor 7 can realize running modes exemplified in Table 1.

TABLE 1

A LIST OF RUNNING MODES

|  | normal FF mode | disconnect mode | normal 4WD mode | hybrid FF mode | hybrid 4WD mode | pure EV-FF mode | pure EV-FR mode |
| --- | --- | --- | --- | --- | --- | --- | --- |
| T/M | ON | ON | ON | ON | ON | OFF | OFF |
| first clutch device | CLOSE | OPEN | CLOSE | CLOSE | CLOSE | CLOSE | OPEN |
| second clutch device | OPEN | OPEN | CLOSE | OPEN | CLOSE | OPEN | CLOSE |
| electric motor | OFF | OFF | OFF | ON | ON | ON | ON |
| propeller shaft | driven | idle | driven | driven | driven | driven | driven |

When the transmission 11 (referred to as "T/M" in Table 1) is connected ("ON" in Table 1), the first clutch mechanism 35 is engaged ("CLOSE" in Table 1), the second clutch mechanism 39 is disengaged ("OPEN" in Table 1), and the electric motor 7 is switched OFF, the vehicle of the present embodiment runs in a normal front-wheel drive mode ("normal FF mode" in Table 1). Then the propeller shaft 37 receives the drive force and therefore rotates.

If the transmission 11, the second clutch mechanism 39 and the electric motor 7 are kept in the aforementioned state and the first clutch mechanism 35 is disengaged, the vehicle still runs in the front-wheel drive mode. Then the vehicle is in a disconnect mode in which the drive force is not transmitted to the propeller shaft 37 and therefore the propeller shaft 37 can stall.

If the transmission 11 and the electric motor 7 are kept in the aforementioned state and the clutch mechanisms 35,39 are both disengaged, the vehicle runs in a normal 4WD mode in which the drive force by the motor drives both the front wheels and the rear wheels. Also in this state, the propeller shaft 37 rotates. A so-called on-demand-coupling function can be given to the vehicle, in which, by controlling pressure on the multiplate clutch 87, distribution of the drive force to the rear wheels is controlled.

It is possible to additionally use drive force of the electric motor 7 to run the vehicle (a hybrid mode). For example, when the electric motor 7 is switched ON in the normal FF mode, the vehicle runs in a hybrid FF mode in which both the motor 9 and the electric motor 7 exert drive force on the front wheels. When the second clutch mechanism 39 is made engaged in this state, the vehicle runs in a hybrid 4WD mode in which both the motor 9 and the electric motor 7 exert drive force and the drive force is transmitted to both the front and rear wheels.

Alternatively, it is possible not to use the motor 9 but to use the electric motor 7 only, to run the vehicle (a pure EV mode). When the transmission 11 is disconnected ("OFF" in Table 1) in the normal FF mode and the electric motor 7 is switched ON, the vehicle runs in a pure EV-FF mode in which the electric motor 7 drives the front wheels. Alternatively, when the first clutch mechanism 35 is disengaged and the second clutch mechanism 39 is engaged, the vehicle runs in a pure EV-FR mode in which the electric motor 7 drives the rear wheels.

More specifically, the present embodiment enables at least the aforementioned seven running modes. These seven modes may be put on manual selection by a driver person or another construction may be used, in which a controller may automatically determine and select one of the running modes on the basis of running states of the vehicle detected by various sensors.

The intermediate train section can be, in the two-wheel drive mode, put in a stalled state according to the present embodiment. As driving energy is not exhausted to accelerate or decelerate the intermediate train section, energy efficiency can be improved.

Further according to the present embodiment, at a time of changeover from the two-wheel drive mode to the four-wheel drive mode, the rotation speed of the intermediate train section can be synchronized in advance with that of the first drivetrain section and the second drivetrain section by the electric motor. As it is not necessary to cause considerable friction in the frictional clutch for the purpose of synchronization, loss of drive energy can be suppressed, and wear of the frictional clutch caused by considerable frictional heat will not occur. Excellent energy efficiency, good response to output from the motor, and a long life of the clutch can be expected.

Further according to the present embodiment, a hybrid system can be realized not by a complex structure in which an internal combustion engine and an electric motor are combined together in a transmission, but by the simple structure as described above. Further as exemplified in Table 1, various running modes can be realized even by the simple structure. A conventional hybrid system having a system in which an internal combustion engine and an electric motor are combined together cannot readily realize either a pure EV-FR mode or a pure EV-FF mode depending on whether this system is placed on the side of the front wheels or the side of the rear wheels. The present embodiment can realize both these modes and therefore enable various ways of running adapted for various road surface conditions.

Figure 2:
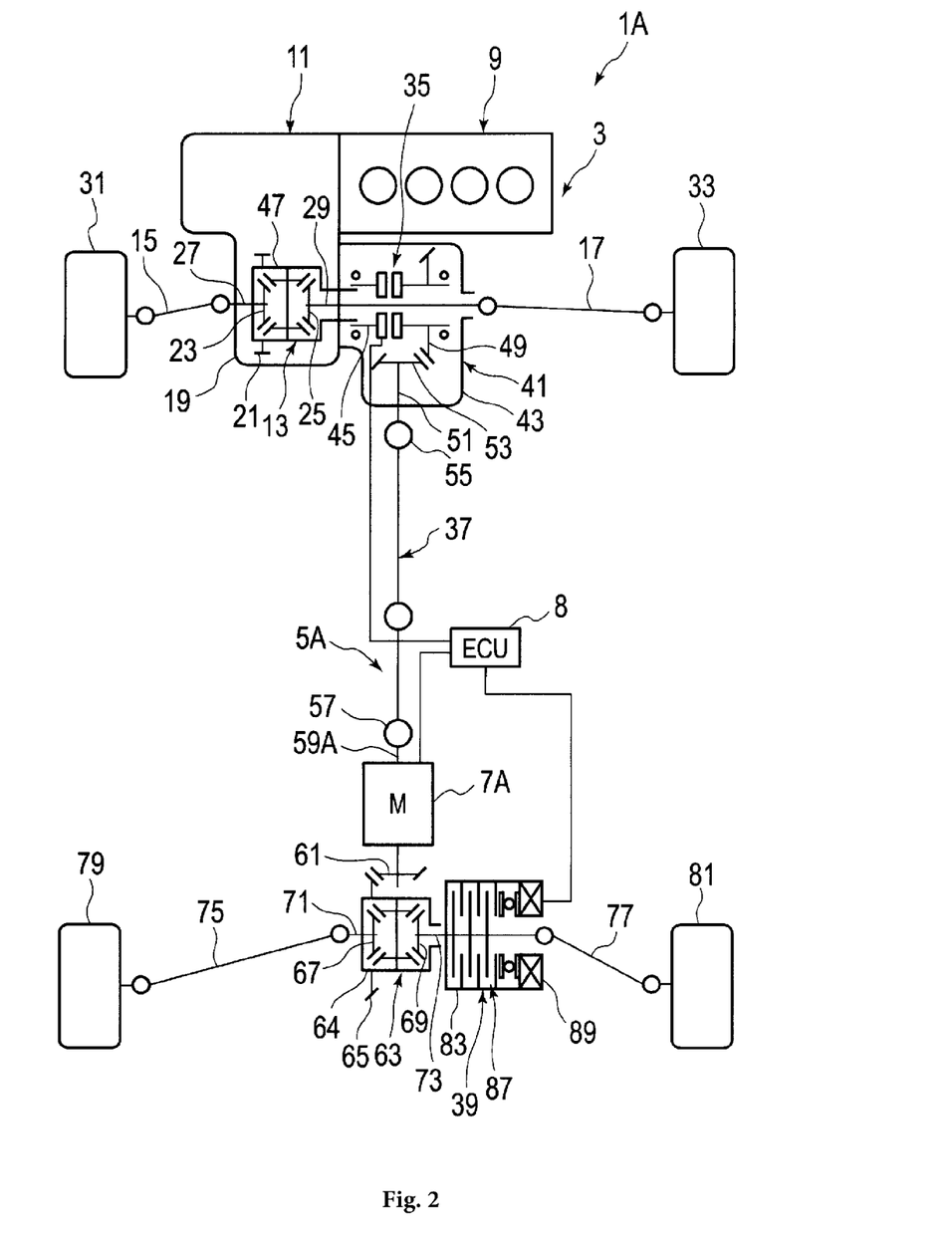
FIG. 2 is a schematic drawing depicting a drivetrain according to a second embodiment.

By modifying the aforementioned embodiment, it is possible that the electric motor is combined directly with the intermediate train section without having intervening gears. FIG. 2 shows a drivetrain 1A of the modified embodiment.

Referring to FIG. 2, an electric motor 7A is integrated in an intermediate train section, a drive pinion shaft 59A thereof for example, so as to directly drive it. To adapt relating high-speed rotation by the electric motor 7A to rotation suitable for the drive pinion shaft 59A, a coaxial reduction gear set such as planetary gears may be interposed between the electric motor 7A and the drive pinion shaft 59A. Further, the electric motor 7A may be integrated in a propeller shaft 37 or any other rotary elements, instead of the drive pinion shaft 59A.

This modified embodiment exhibits effects similar to those of the first embodiment as described above.

Figure 3:
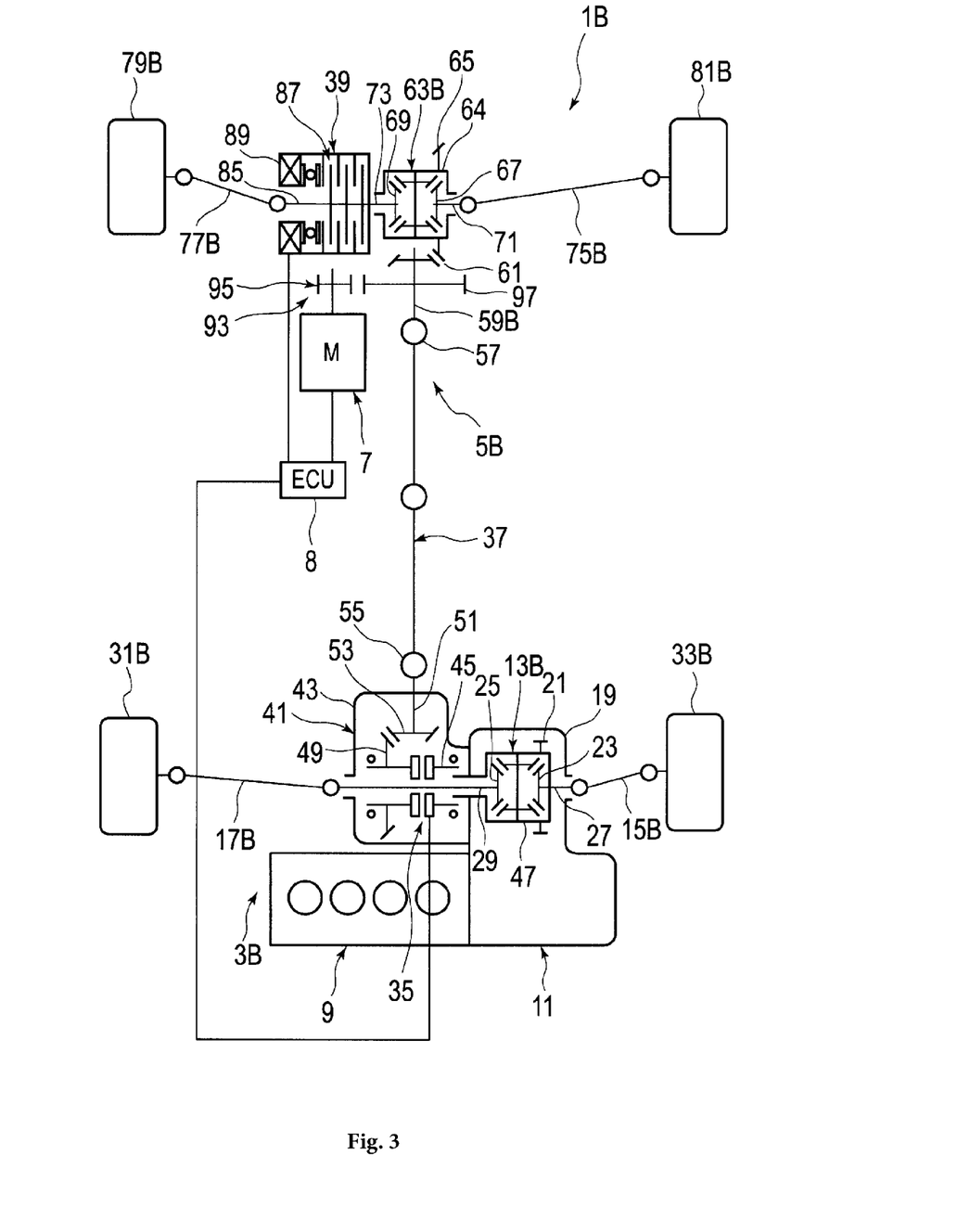
FIG. 3 is a schematic drawing depicting a drivetrain according to a third embodiment.

Further as stated already, any of the aforementioned embodiments can be applied to vehicles of rear-wheel-based four-wheel-drive systems. FIG. 3 shows a drivetrain 1B according to such an embodiment.

Contrary to the embodiments described so far, the first axles are the rear axles 15B,17B and the second axles are the front axles 75B,77B. Referring to FIG. 3, the drivetrain 1B comprises a first drivetrain section 3B, a second drivetrain section 5B, and an intermediate train section including a propeller shaft 37 interposed therebetween. The first drivetrain section 3B steadily transmits drive force by a transmission 11 including a motor 9 via a rear differential 13B to the rear axles 15B,17B, thereby driving them. The second drivetrain section 5B is drivingly coupled with the front axles 75B,77B via a front differential 63B. The intermediate train section, when connected with both the drivetrain sections 3B,5B, transmits a part of the drive force transmitted to the first drivetrain section 3B to the second drivetrain section 5B.

The electric motor 7 is drivingly coupled with the intermediate train section, a drive pinion shaft 59B thereof for example, via a gear set 93. The front axles 75B,77B are respectively coupled with front wheels 81B,83B, and the rear axles 15B,17B are respectively coupled with rear wheels 33B,35B, thereby running the vehicle.

By changing over the first clutch mechanism 35 and the second clutch mechanism 39, respectively, running modes can be changed with keeping a state where rotations are synchronized, and the 7 drive modes can be realized as with that case described above.

Figure 4:
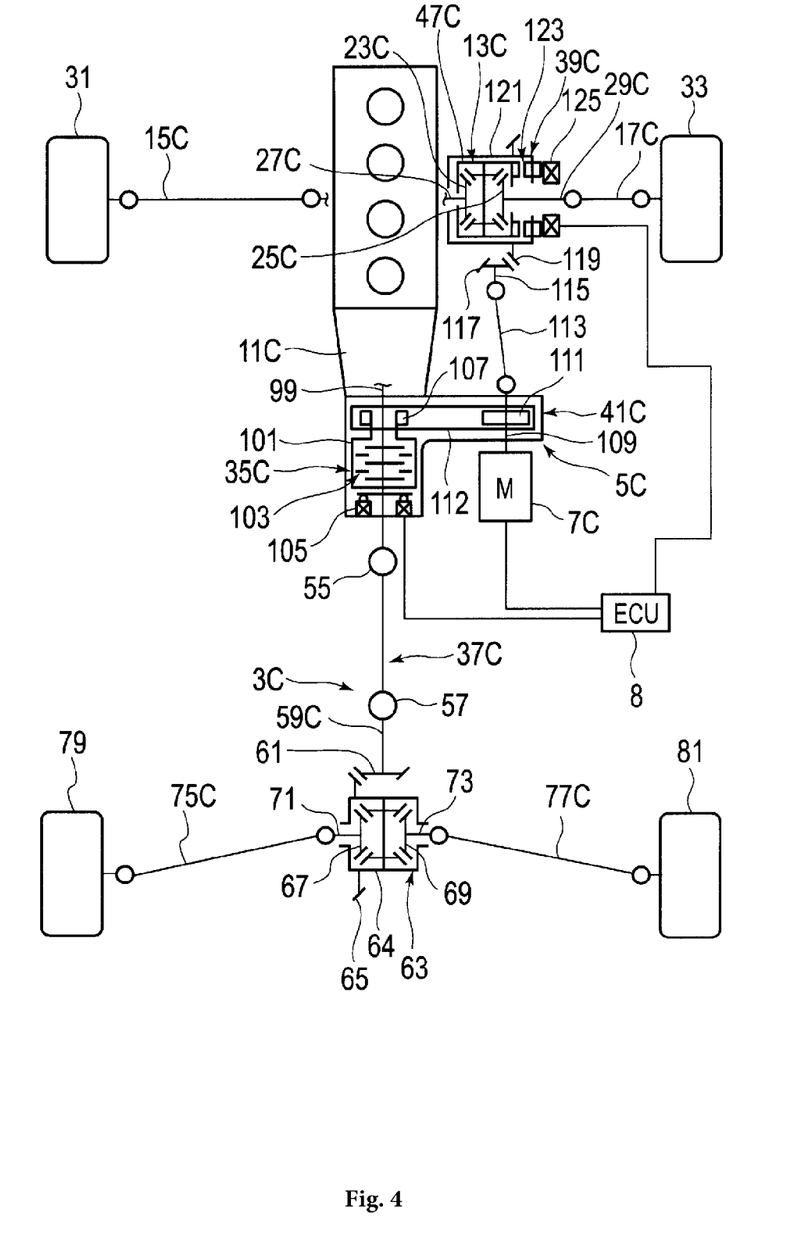
FIG. 4 is a schematic drawing depicting a drivetrain according to a fourth embodiment.

Further, even in a rear-wheel-drive base vehicle, an embodiment in which a motor is disposed at its front, which is a so-called FR-layout, could be possible. FIG. 4 shows a drivetrain of such an embodiment.

Referring to FIG. 4, a transmission 11C including a motor is disposed at the front. Driving force by the transmission 11C is led out through the output shaft 99.

An end of the output shaft 99 is drivingly coupled with a propeller shaft 37C via a universal joint 55. An opposite end of the propeller shaft 37C is drivingly coupled with a drive pinion shaft 59C via the universal joint 57. The drive pinion shaft 59C comprises a drive pinion gear 61 and drivingly coupled with a rear differential 63. The drive force by the transmission 11C is thereby steadily transmitted to rear axles 75C,77C via a first drivetrain section 3C including the rear differential 63.

A second drivetrain section 5C in the drivetrain according to the present embodiment comprises a front differential 13C, and its side gears 23C,25C are respectively coupled with mediate shafts 27C,29C and further with front axles 15C,17C, thereby allowing differential motion between the front axles 15C,17C.

The drivetrain according to the present embodiment comprises, in order to transmit a part of the drive force of the first drivetrain section 3C to the second drivetrain section 5C, an intermediate train section interposed therebetween. The intermediate train section is, for example, constituted of a propeller shaft 113, a drive pinion shaft 115 connected thereto via a universal joint and such, and a drive pinion gear 117 provided at its end. As the drive pinion gear 117 engages with a ring gear 119 described later, the drive force is transmitted to the second drivetrain section 5C.

The drivetrain according to the present embodiment further comprises a first clutch mechanism 35C and a second clutch mechanism 39C. The first clutch mechanism 35C disconnectably connects the first drivetrain section 3C with the intermediate train section. Further the second clutch mechanism 39C disconnectably connects the intermediate train section with the second drivetrain section 5C. More specifically, when both the first clutch mechanism 35C and the second clutch mechanism 39C get disengaged, the drive force is transmitted only to the rear wheels. Therefore this vehicle runs in a rear-wheel-drive mode and, when both get engaged, runs in a four-wheel-drive mode.

A frictional clutch such as a multiplate clutch 103 is applied to the first clutch mechanism 35C, which is, for example, housed in a transfer 41C combined with the transmission 11C. In the example of the multiplate clutch 103, one set of disks of the multiplate clutch 103 is supported by a clutch case 101, and another set of disks is supported by an output shaft 99. It may be supported by any other rotary element of the first drivetrain section 3C, instead of the output shaft 99. The first clutch mechanism 35C comprises an actuator 105 driven by a solenoid or such and can thereby switch between its engagement and disengagement.

The clutch case 101 comprises, for example, a sprocket 107 and is, by a chain 112, capable of outputting a part of the drive force to the intermediate train section. Instead of the chain drive, a gear set or any other coupling form may be used.

The second clutch mechanism 39C along with, or may be as a separate body from, the front differential 13C is housed in an outer case 121. The outer case 121 comprises a ring gear 119, which engages with the drive pinion gear 117 to receive the drive force from the intermediate train section. The outer case 121 disconnectably connects with the casing 47C of the front differential 13C by means of a claw clutch 123. Instead of the claw clutch, a clutch of another type such as a frictional clutch may be applied thereto. The second clutch mechanism 39C comprises an actuator 125 driven by a solenoid or such and can thereby switch between its engagement and disengagement.

When both the first clutch mechanism 35 and the second clutch mechanism 39 get disengaged, the drive force is transmitted only to the rear wheels and then the vehicle runs in a rear-wheel-drive mode. When both get engaged, as the drive force is transmitted to the front wheels as well, the vehicle runs in a four-wheel-drive mode.

The electric motor 7C comprises an output shaft 109 which rotates by its drive force, and the output shaft 109 is coupled with the propeller shaft 113 via a universal joint and such. Alternatively it may be connected via a gear mechanism or such to the intermediate train section. Further the output shaft 109 comprises a sprocket 111 engaging with a chain 112. Alternatively, as described above, instead of the chain drive, a gear set or any other coupling form may be used. The electric motor 7C, in addition to the motor, can also give drive force to the vehicle.

As with the embodiments so far, an ECU 8 may be provided, which is connected to the clutch mechanisms 35C,39C, the electric motor 7 and the other elements.

As with the embodiments so far, by switching the first clutch mechanism 35C and the second clutch mechanism 39C respectively, running modes can be changed while keeping a state where rotations are synchronized, and these seven drive modes can be realized. The device can suppress loss of driving energy and does not cause generation of great frictional heat that leads to exhaustion of the frictional clutch. A hybrid system can be realized by such a simple construction. It is enabled that various drive modes enable the vehicle to run in various ways suitable to various road surface conditions.

Examples in which the devices are applied to four-wheeled vehicles have been described heretofore, but the devices may be of course applied to a vehicle having more than four wheels. Further a synchronizer is applicable to any of the constructions described above. Further, a motor/generator which has a function of regenerating energy when decelerating is applicable to the electric motor applicable.

Although the invention has been described above by reference to certain exemplary embodiments of the invention, the invention is not limited to the exemplary embodiments described above. Modifications and variations of the embodiments described above will occur to those skilled in the art, in light of the above teachings.

The invention claimed is:

1. A method for controlling a drivetrain to drive a vehicle by a first motor and a second motor, the drivetrain uninterruptedly coupling the first motor with a first axle and comprising a propeller shaft transmitting torque from the first motor to a second axle and being uninterruptedly coupled with the second motor, a first clutch for disconnectably connecting the first motor with the propeller shaft, and a second clutch for disconnectably coupling the propeller shaft with the second axle, the method comprising:
   activating the first motor and the second motor;
   connecting the first clutch to cause both the first motor and the second motor to drive the first axle; and
   connecting or disconnecting the second clutch to control torque transmission from the first motor and the second motor to the second axle, whereby the vehicle is operated in a hybrid mode in which both the first motor and the second motor drive the vehicle.

2. The method of claim 1, further comprising:
   disconnecting the first clutch to free the first axle from the second motor, or disconnecting the second clutch to free the second axle from the second motor; and
   resting the first motor, whereby the hybrid mode is changed into a mode where only the second motor drives the vehicle.

3. A drivetrain system to drive a vehicle by a first motor and a second motor, the system comprising:
   a drivetrain uninterruptedly coupling the first motor with a first axle and comprising a propeller shaft transmitting torque from the first motor to a second axle and being uninterruptedly coupled with the second motor, a first clutch for disconnectably connecting the first motor with the propeller shaft, and a second clutch for disconnectably coupling the propeller shaft with the second axle,
   means for activating the first motor and the second motor;
   means for connecting the first clutch to cause both the first motor and the second motor to drive the first axle; and
   means for connecting or disconnecting the second clutch to control torque transmission from the first motor and the second motor to the second axle, whereby the vehicle is operated in a hybrid mode in which both the first motor and the second motor drive the vehicle.

4. The system of claim 3, further comprising:
   means for disconnecting the first clutch to free the first axle from the second motor, or disconnecting the second clutch to free the second axle from the second motor; and means for resting the first motor, whereby the hybrid mode is changed into a mode where only the second motor drives the vehicle.

* * * * *